(12) United States Patent
Hu et al.

(10) Patent No.: US 11,520,128 B2
(45) Date of Patent: Dec. 6, 2022

(54) ZOOM PROJECTION LENS

(71) Applicant: Coretronic Corporation, Hsin-Chu (TW)

(72) Inventors: Li-Lun Hu, Hsin-Chu (TW);
Ching-Chuan Wei, Hsin-Chu (TW);
Meng-Feng Chung, Hsin-Chu (TW);
Tao-Hung Kuo, Hsin-Chu (TW);
Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 289 days.

(21) Appl. No.: 16/879,701

(22) Filed: May 20, 2020

(65) Prior Publication Data
US 2020/0379224 A1 Dec. 3, 2020

(30) Foreign Application Priority Data
May 29, 2019 (CN) .......................... 201920787911.1

(51) Int. Cl.
| | | |
|---|---|---|
| *G02B 15/14* | (2006.01) | |
| *G02B 9/00* | (2006.01) | |
| *G02B 15/177* | (2006.01) | |
| *G02B 13/04* | (2006.01) | |
| *G02B 9/64* | (2006.01) | |

(52) U.S. Cl.
CPC ............. *G02B 15/177* (2013.01); *G02B 9/64* (2013.01); *G02B 13/04* (2013.01)

(58) Field of Classification Search
CPC .. G02B 15/00; G02B 15/145; G02B 15/1455; G02B 15/145533; G02B 15/15; G02B 15/177; G02B 13/00; G02B 13/001; G02B 13/0015; G02B 13/002; G02B 13/0045; G02B 13/006; G02B 13/009; G02B 9/00; G02B 9/60; G02B 9/64
USPC .......................... 359/676–685, 649–651, 754
See application file for complete search history.

(56) References Cited

U.S. PATENT DOCUMENTS

| | | | |
|---|---|---|---|
| 6,008,952 | A | 12/1999 | Yamamoto |
| 6,137,638 | A | 10/2000 | Yamagishi et al. |
| 6,480,340 | B1 | 11/2002 | Yamamoto |
| 6,515,803 | B2 | 2/2003 | Hirose |

(Continued)

FOREIGN PATENT DOCUMENTS

| | | | |
|---|---|---|---|
| CN | 100472268 | | 3/2009 |
| CN | 106501918 | | 3/2017 |
| JP | 2011-222191 | * | 2/2011 |

*Primary Examiner* — Thong Q Nguyen
(74) *Attorney, Agent, or Firm* — JCIPRNET (57) ABSTRACT

A zoom projection lens with eleven lens elements is provided. The zoom projection lens sequentially includes a first lens group, a second lens group, a third lens group, an aperture stop, a fourth lens group and a fifth lens group along an optical axis from a screen side to an image source side. The first lens group has a negative refractive power and includes three lens elements. The second lens group has a positive refractive power and includes one lens element. The third lens group has a positive refractive power and includes one lens element. The fourth lens group has a negative refractive power and includes four lens elements. The fifth lens group has a positive refractive power and includes two lens elements. A first lens element in the first lens group is an aspheric lens made of plastic.

11 Claims, 9 Drawing Sheets

(56) References Cited

U.S. PATENT DOCUMENTS

| | | | |
|---|---|---|---|
| 7,170,691 B2* | 1/2007 | Sawamoto | G02B 15/145523 359/680 |
| 8,270,092 B2* | 9/2012 | Nagatoshi | G02B 15/145531 359/680 |
| 2012/0105972 A1 | 5/2012 | Huang et al. | |
| 2018/0307011 A1* | 10/2018 | Uehara | G02B 15/177 |

* cited by examiner

ZOOM PROJECTION LENS

CROSS-REFERENCE TO RELATED APPLICATION

This application claims the priority benefit of China application serial no. 201920787911.1, filed on May 29, 2019. The entirety of the above-mentioned patent application is hereby incorporated by reference herein and made a part of this specification.

BACKGROUND

Technical Field

The invention relates to a projection lens, and particularly relates to a zoom projection lens.

Description of Related Art

Current zoom projection lens has a design trend toward large aperture (high light efficiency), high zoom magnification, and low image distortion, etc. However, in the existing design, in order to meet the above requirements, the number of lens elements required by the zoom projection lens must be increased, so that a size, weight, and manufacturing cost of the zoom projection lens are increased. Therefore, how to maintain good optical imaging quality while reducing the number of the lens elements has become one of research and development priorities.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a zoom projection lens, which is capable of maintaining good optical imaging quality while reducing the number of lens elements.

Other objects and advantages of the invention may be further illustrated by the technical features broadly embodied and described as follows.

In order to achieve one or a portion of or all of the objects or other objects, an embodiment of the invention provides a zoom projection lens with eleven lens elements. The zoom projection lens sequentially includes a first lens group, a second lens group, a third lens group, an aperture stop, a fourth lens group and a fifth lens group along an optical axis from a screen side to an image source side. The first lens group has a negative refractive power and includes three lens elements. The second lens group has a positive refractive power and includes one lens element. The third lens group has a positive refractive power and includes one lens element. The fourth lens group has a negative refractive power and includes four lens elements. The fifth lens group has a positive refractive power and includes two lens elements. A first lens element in the first lens group is an aspheric lens made of plastic.

Based on the above description, the embodiment of the invention has at least one of following advantages or effects. Compared with the existing zoom projection lens, the zoom projection lens of the invention uses eleven lens elements to form five lens groups, and by adjusting relative positions of the five lens groups, a zoom function is realized. Moreover, the first lens element is an aspheric lens made of plastic, which avails reducing the manufacturing cost and maintaining optical imaging quality. Therefore, the zoom projection lens of the invention is capable of maintaining good optical imaging quality while reducing the number of lens elements.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
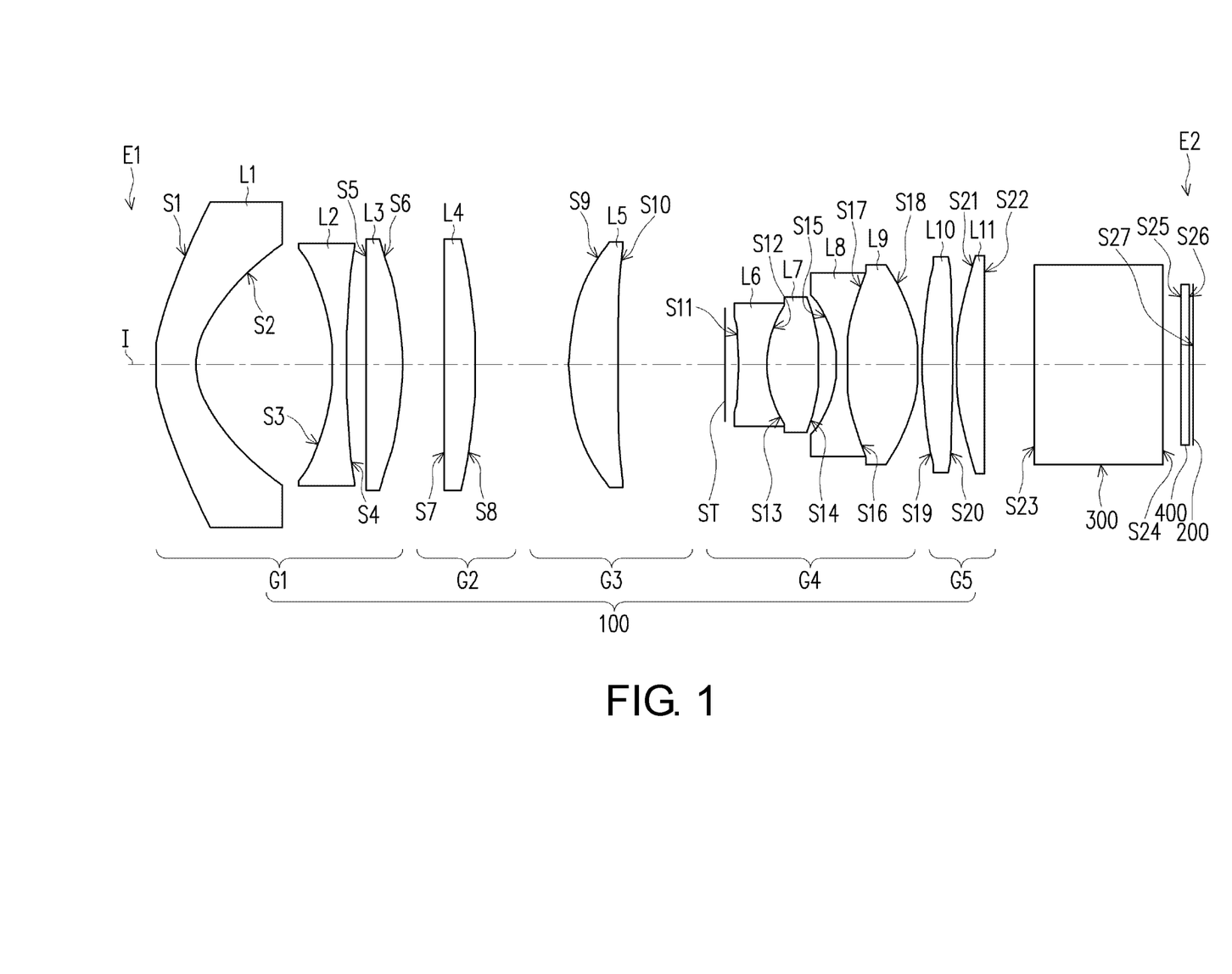
FIG. 1 is a schematic diagram of a zoom projection lens according to an embodiment of the invention.

FIG. 1 is a schematic diagram of a zoom projection lens 100 according to an embodiment of the invention. Referring to FIG. 1, the zoom projection lens 100 of a projector is adapted to receive an image beam (not shown) transmitted from a light valve 200 and project the image beam to a screen (not shown), a wall (not shown) or other object (not shown) which is able to display the projection iag. In other words, the zoom projection lens 100 is disposed between a screen side E1 and an image source side E2, wherein the screen side E1 is defined by a position of an object capable of forming a projection image, and the image source side E2 is defined by a position of the light valve 200.

FIG. 1 schematically illustrates a light transmitting element 300 disposed between the zoom projection lens 100 and the light valve 200. The light transmitting element 300 is disposed on a transmission path of an illumination beam (not shown) coming from an illumination system (not shown), so as to transmit the illumination beam from the illumination system to the light valve 200. The light valve 200 is disposed on a transmission path of the illumination beam transmitted from the light transmitting element 300, so as to convert the illumination beam into the image beam. The light transmitting element 300 is further disposed on a transmission path of the image beam transmitted from the light valve 200, so as to transmit the image beam transmitted from the light valve 200 to the zoom projection lens 100. The illumination system, the zoom projection lens 100, the light valve 200 and the light transmitting element 300 are components in a projector (not shown), and the zoom projection lens 100 may project the image beam transmitted from the light valve 200 to a screen outside the projector. For example, the light valve 200 may be a digital micro-mirror device (DMD), a liquid-crystal-on-silicon (LCOS) panel or other proper spatial light modulator (SLM), and the light transmitting element 300 may include at least one prism, but the invention is not limited thereto. In the embodiment, a cover glass 400 may be further disposed between the light transmitting element 300 and the light valve 200 to protect the light valve 200 and to prevent the light valve 200 from adhering dust.

The zoom projection lens 100 sequentially includes a first lens group G1, a second lens group G2, a third lens group G3, an aperture stop ST, a fourth lens group G4 and a fifth lens group G5 along an optical axis I from the screen side E1 to the image source side E2. In other words, the image beam transmitted from the light valve 200 sequentially passes through the light transmitting element 300, the fifth lens group G5, the fourth lens group G4, the aperture stop ST, the third lens group G3, the second lens group G2 and the first lens group G1 and is projected to an object which is able to display the projection image. By configuring the aperture stop ST between the third lens group G3 and the fourth lens group G4 (i.e. the aperture stop ST is disposed near a center of the zoom projection lens 100), it avails a design of an exit pupil, and avails achieving a required zoom ability.

The refractive powers of the first lens group G1 to the fifth lens group G5 are sequentially negative, positive, positive, negative and positive. The negative refractive power of the first lens group G1 avails improving a light collecting effect and facilitates an optical path design and lens fabrication. The refractive powers of the second lens group G2 to the fifth lens group G5 being positive, positive, negative and positive avails aberration correction. Moreover, the positive refractive power of the fifth lens group G5 results in a better a light converging effect, and avails improving resolution of the projection image.

The first lens group G1 includes three lens elements, i.e., a first lens element L1, a second lens element L2 and a third lens element L3. The second lens group G2 includes one lens element, i.e., a fourth lens element L4. The third lens group G3 includes one lens element, i.e., a fifth lens element L5. The fourth lens group G4 includes four lens elements, i.e., a sixth lens element L6, a seventh lens element L7, an eighth lens element L8 and a ninth lens element L9. The fifth length group G5 includes two lens elements, i.e., a tenth lens element L10 and an eleventh lens element L11. In the embodiment, the first lens element L1 to the eleventh lens element L11 are sequentially arranged along the optical axis I from the screen side E1 to the image source side E2. Moreover, refractive powers of the first lens element L1 to the eleventh lens element L11 are sequentially negative, negative, positive, positive, positive, negative, positive, negative, positive, positive and positive.

For example, the first lens element L1 is a convex-concave lens and a convex surface thereof faces the screen side E1. The second lens element L2 is a biconcave lens. The third lens element L3 is a plano-convex lens and a convex surface thereof faces the image source side E2. The fourth lens element L4 is a plano-convex lens and a convex surface thereof faces the image source side E2. The fifth lens element L5 is a convex-concave lens and a convex surface thereof faces the screen side E1. The sixth lens element L6 is a biconcave lens. The seventh lens element L7 is a biconvex lens. The eighth lens element L8 is a biconcave lens. The ninth lens element L9 is a biconvex lens. The tenth lens element L10 is a biconvex lens. The eleventh lens element L11 is a plano-convex lens and a convex surface thereof faces the screen side E1. However, surface types of each of the lens elements may be changed according to an actual requirement, which is not limited by the invention.

In the embodiment, the zoom projection lens 100 has eleven lens elements, and the total number of lens elements of the zoom projection lens 100 is, for example, eleven, wherein the first lens element L1 is the lens element closest to the screen side E1 in the eleven lens elements, and the eleventh lens element L11 is the lens element closes to the image source side E2 in the eleven lens elements. By making the first lens element L1 in the first lens group G1 to be an aspheric lens made of plastic, it not only helps aberration correction (such as spherical aberration, coma aberration, astigmatic field curvature or distortion, etc.), it also helps reducing a diameter of the first lens element L1, thereby reducing a weight, a volume, and manufacturing cost of the zoom projection lens 100. Moreover, by making the eleventh lens element L11 to be a spherical lens, for example, a spherical lens made of glass, it helps reducing the manufacturing cost of the zoom projection lens 100. In the embodiment, the second lens element L2 to the eleventh lens element L11 are all spherical lens elements, and the second lens element L2 to the eleventh lens element L11 are all lens elements made of glass, so as to further reduce the whole manufacturing cost of the zoom projection lens 100.

In the fourth lens group G4, the sixth lens element L6 and the seventh lens element L7 may construct a double cemented lens, and the eighth lens element L8 and the ninth lens element L9 construct another one double cemented lens, which not only helps aberration correction, but also helps reducing a total length of the fourth lens group G4, so as to further reduce a volume of the zoom projection lens 100.

In the zoom projection lens 100, a distance between any two adjacent lens elements in any one of the first lens group G1 and the fourth lens group G4 is a constant value, namely, the distance between any two adjacent lens elements in any one of the first lens group G1 and the fourth lens group G4 is not changed along with a change of a focal length of the zoom projection lens 100. To be specific, in the first lens group G1, the distance between the first lens element L1 and the second lens element L2 is fixed, and the distance between the second lens element L2 and the third lens element L3 is fixed. Moreover, in the fourth lens group G4, the distance between the sixth lens element L6 and the seventh lens element L7 is fixed, the distance between the seventh lens element L7 and the eighth lens element L8 is fixed, and the distance between the eighth lens element L8 and the ninth lens element L9 is fixed. The aforementioned distances refers to straight-line distances between two adjacent lens centers on the optical axis I.

On the other hand, a distance between the first lens group G1 and the object which is able to display the projection image, a distance between the first lens group G1 and the second lens group G2, a distance between the second lens group G2 and the third lens group G3, a distance between the third lens group G3 and the aperture stop ST and a distance between the fourth lens group G4 and the fifth lens group G5 are variable. To be specific, the first lens group G1 is adapted to move along the optical axis I between the screen side E1 and the image source side E2, so as to focus the zoom projection lens 100. Moreover, the second lens group G2, the third lens group G3 and the fourth lens group G4 are adapted to move along the optical axis I between the screen side E1 and the image source side E2, so as to adjust a size of the projection image. Furthermore, the fifth lens group G5 may be stationary when adjusting the size of the projection image. In other words, when adjusting the size of the projection image, the distance between the tenth lens element L10 and the eleventh lens element L11 and the distance between the fifth lens group G5 and the light transmitting element 300 are fixed.

In the embodiment, the zoom projection lens 100 may be a true zoom lens, i.e., when the zoom projection lens 100 is switched between a wide-end and a tele-end, positions of the plurality of lens groups may be adjusted at the same time, so that the clarity of the projection image may be adjusted without performing additional focusing steps. The so-called wide-end and the tele-end refer to conditions that a focal length is adjusted to the longest and shortest in the same zoom projection lens.

Moreover, the zoom projection lens 100 may satisfy:

1.6<|F1/Fw|<2.1;
4.8<|F2/Fw|<5.8;
5.0<|F4/Fw|<15.0; and
1.8<|F5/Fw|<2.5, wherein Fw is an effective focal length (EFL) of the zoom projection lens 100, F1 is an EFL of the first lens group G1, F2 is an EFL of the second lens group G2, F4 is an EFL of the fourth lens group G4, and F5 is an EFL of the fifth lens group G5. According to the above design, a volume and the optical imaging quality of the zoom projection lens 100 may be balanced.

A table 1 to a table 3 are provided below to list data of an exemplary embodiment of the zoom projection lens 100. However, the data listed below is not used for limiting the invention. After referring to the invention, any person with ordinary skills in the art may make appropriate changes to its parameters or settings without departing from the scope or spirit of the invention.

In the table one, "distance" refers to a distance between two adjacent surfaces on the optical axis I. For example, a distance corresponding to a surface S1 refers to a distance between the surface S1 and a surface S2 on the optical axis I. Moreover, since the sixth lens element L6 and the seventh lens element L7 construct a double cemented lens, a surface S12 of the sixth lens element L6 and a surface S13 of the seventh lens element L7 have a same radius of curvature, and a distance between the surface S12 and the surface S13 on the optical axis is zero, so that in the tablel, the surface S12 of the sixth lens element L6 is omitted. Similarly, the eighth lens element L8 and the ninth lens element L9 construct another one double cemented lens, a surface S16 of the eighth lens element L8 and a surface S17 of the ninth lens element L9 have a same radius of curvature, so that in the table one, the surface S16 of the eighth lens element L8 is omitted.

TABLE 1

| Component | Surface | Radius of curvature (mm) | Distance (mm) | Refractive index | Abbe number |
|---|---|---|---|---|---|
| First lens element L1 | S1 | 19.47 | 6.00 | 1.525 | 55.95 |
|  | S2 | 9.94 | 20.36 |  |  |
| Second lens element L2 | S3 | −32.01 | 2.07 | 1.64 | 34.47 |
|  | S4 | 156.62 | 2.77 |  |  |
| Third lens element L3 | S5 | Infinity | 5.36 | 1.749 | 35.28 |
|  | S6 | −53.06 | D3 (variable) |  |  |
| Fourth lens element L4 | S7 | Infinity | 4.61 | 1.749 | 35.28 |
|  | S8 | −79.13 | D4 (variable) |  |  |
| Fifth lens element L5 | S9 | 31.76 | 7.15 | 1.702 | 41.24 |
|  | S10 | 275.60 | D5 (variable) |  |  |
| aperture Stop ST |  | Infinity | 1.97 |  |  |
| Sixth lens element L6 | S11 | −70.54 | 4.29 | 1.785 | 25.68 |
| Seventh lens element L7 | S13 | 16.42 | 7.68 | 1.497 | 81.55 |
|  | S14 | −27.41 | 2.56 |  |  |
| Eighth lens element L8 | S15 | −16.04 | 1.63 | 1.517 | 52.43 |
| Ninth lens element L9 | S17 | 35.77 | 10.51 | 1.618 | 63.33 |
|  | S18 | −24.77 | D9 (variable) |  |  |
| Tenth lens element L10 | S19 | 70.61 | 4.51 | 1.749 | 35.28 |
|  | S20 | −321.42 | 0.6 |  |  |
| Eleventh lens element L11 | S21 | 47.40 | 4.31 | 1.618 | 63.33 |
|  | S22 | Infinity | 7.38 |  |  |
| Light transmitting element 300 | S23 | Infinity | 19.25 | 1.516 | 64.14 |
|  | S24 | Infinity | 2.40 |  |  |
| Cover glass 400 | S25 | Infinity | 1.05 | 1.510 | 60.97 |
|  | S26 | Infinity | 0.70 |  |  |
| Light valve 200 | S27 | Infinity |  |  |  |

In the table one, the surface S1 and the surface S2 of the first lens element L1 are aspheric surfaces, and the surfaces (a surface S3 to a surface S22) of the other lens elements are all spherical surfaces. An equation of the aspheric surface is as follows:

$$X = \frac{Y^2}{R\left(1 + \sqrt{1 - (1+k) \times Y^2/R^2}\right)} + A_4 Y^4 + A_6 Y^6 + A_8 Y^8 + A_{10} Y^{10} + A_{12} Y^{12} + A_{14} Y^{14} + A_{16} Y^{16}$$

In the above equation, X is sag in a direction of the optical axis. R is a radius of an osculating sphere, i.e. a radius of curvature near the optical axis (such as the radius of curvature listed in the table one). K is a conic coefficient. Y is a height of an aspheric surface, i.e. a height from a center of the lens element to an edge of the lens element, and coefficients $A_4$, $A_6$, $A_8$, $A_{10}$, $A_{12}$, $A_{14}$ and $A_{16}$ are aspheric coefficients. Table 2 lists parameters of the surface S1 and the surface S2 of the first lens element L1:

TABLE 2

|  | S1 | S2 |
| --- | --- | --- |
| k | −1.05 | −0.89 |
| $A_4$ | −4.6997E−05 | −8.2514E−05 |
| $A_6$ | 5.3321E−08 | 1.6807E−07 |
| $A_8$ | 1.2067E−10 | −6.6998E−10 |
| $A_{10}$ | −5.7105E−13 | 5.2572E−12 |
| $A_{12}$ | −7.9213E−16 | −2.4626E−14 |
| $A_{14}$ | −7.9213E−19 | 5.4684E−17 |
| $A_{16}$ | 2.5310E−22 | −4.6312E−20 |

A table 3 lists values of the variable distances in the wide-end and the tele-end. In the table 3, a unit of each value is mm.

TABLE 3

|  | Distance D3 | Distance D4 | Distance D5 | Distance D9 |
| --- | --- | --- | --- | --- |
| Wide-end | 6.23 | 13.81 | 15.84 | 0.6 |
| Tele-end | 2.10 | 0.6 | 19.84 | 14.56 |

In the existing zoom projection lens, the zoom projection lens using the same number of lens elements may only achieve a zoom ratio of 1.11 and its F number is 2.03. Comparatively, a zoom ratio of the zoom projection lens 100 of the embodiment is 1.3, and the F number of the zoom projection lens 100 at the wide-end is smaller than 1.7. In other words, the zoom projection lens 100 may have higher zoom ratio and larger aperture (high light emitting efficiency).

Figure 2:
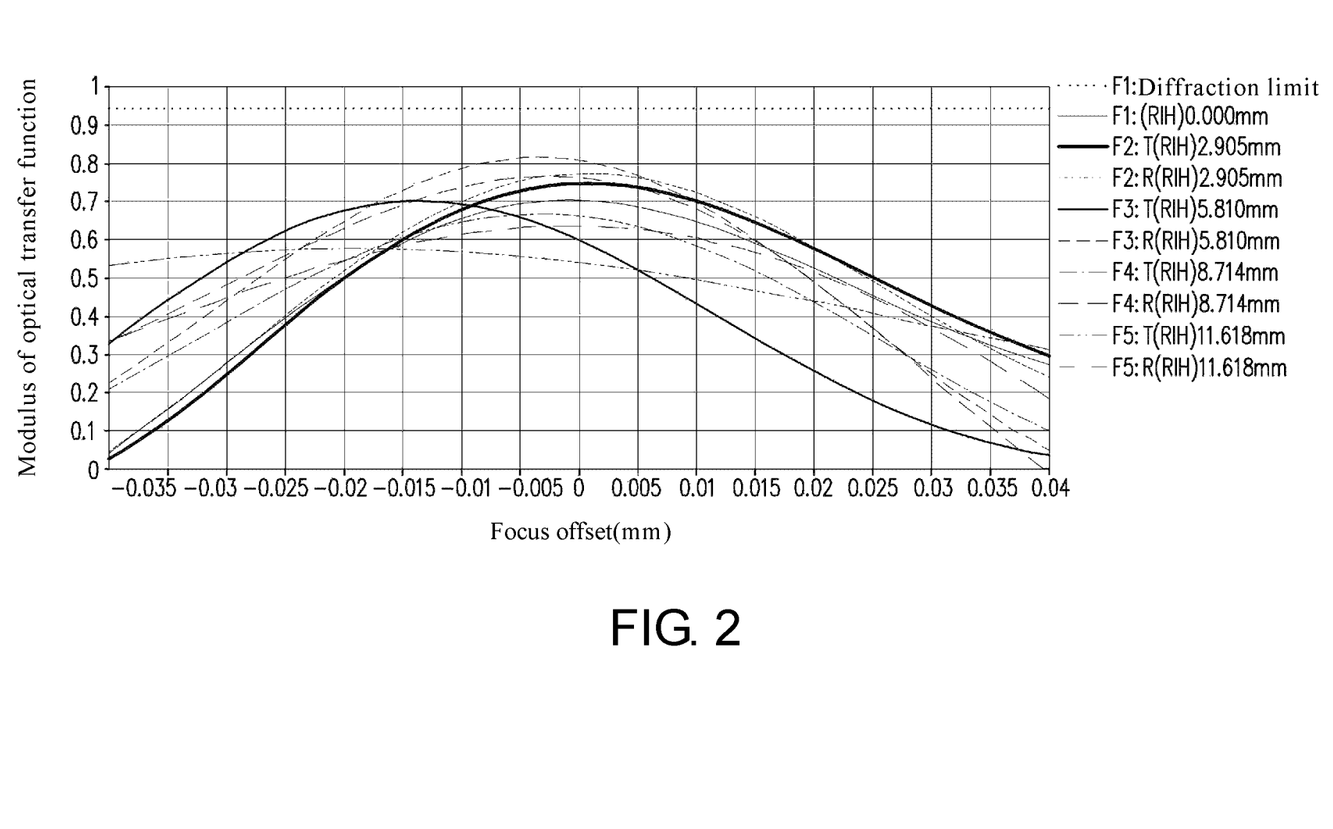
FIG. 2 to FIG. 7 are respectively a modulation transfer function (MTF) curve diagram, a longitudinal spherical aberration diagram, an astigmatic field curvature diagram, a distortion diagram, a ray fan plot diagram and a lateral color aberration diagram of a zoom projection lens at a wide-side according to an embodiment of the invention.
Figure 3:
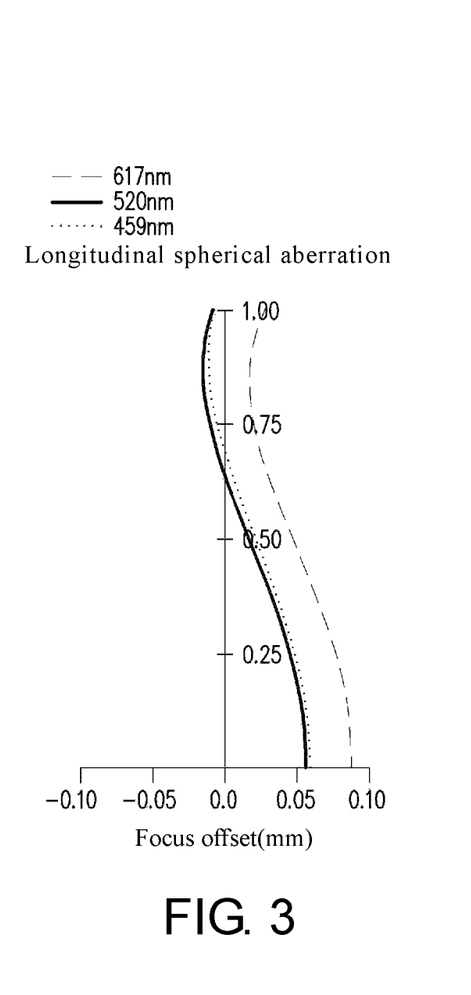
Figure 4:
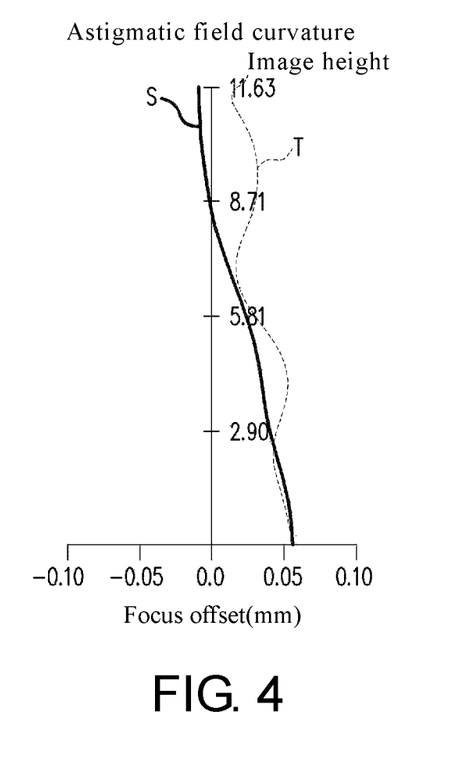
Figure 5:
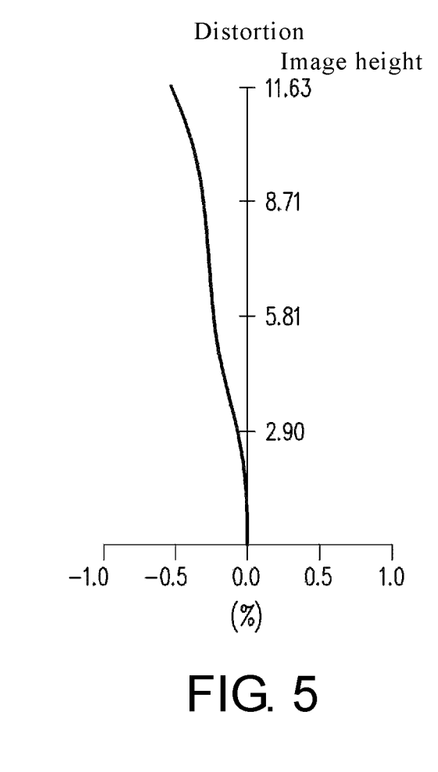
Figure 8:
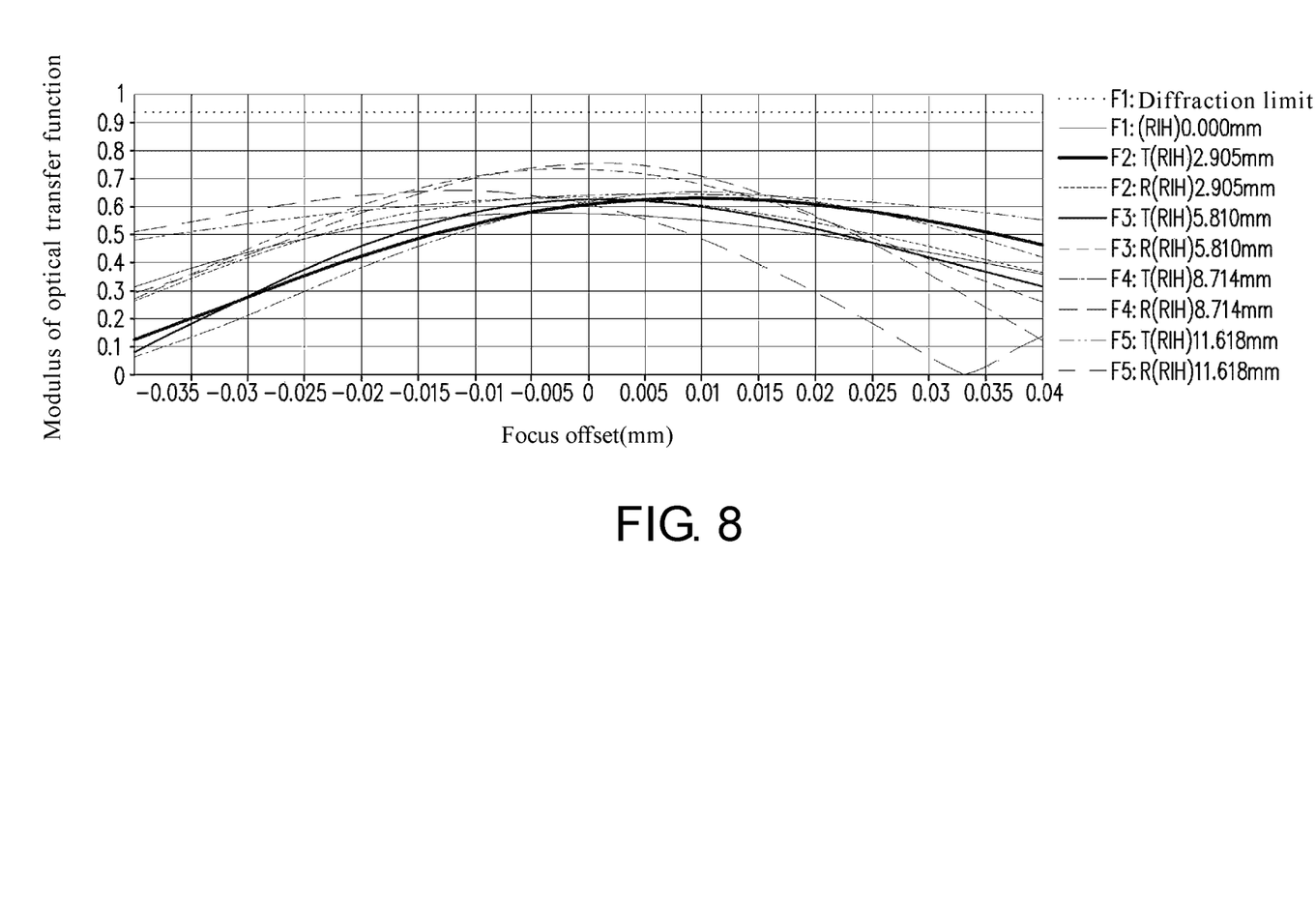
FIG. 8 to FIG. 13 are respectively a modulation transfer function curve diagram, a longitudinal spherical aberration diagram, an astigmatic field curvature diagram, a distortion diagram, a ray fan plot diagram and a lateral color aberration diagram of a zoom projection lens at a tele-side according to an embodiment of the invention.
Figure 9:
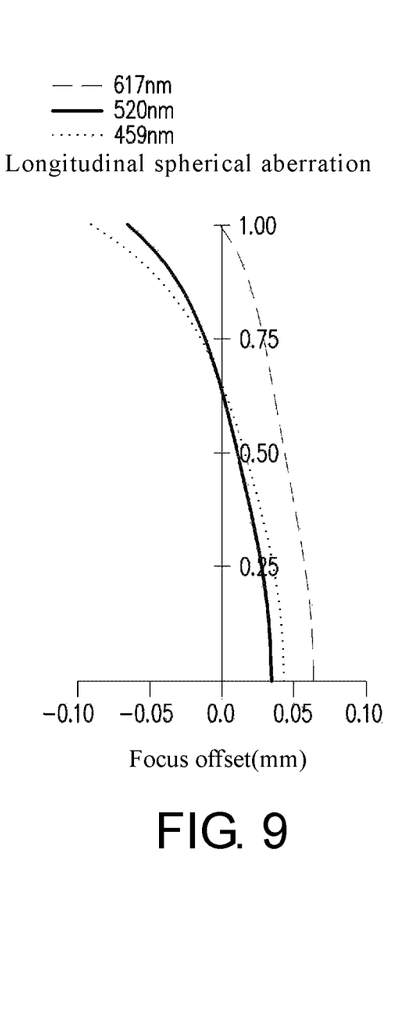
Figure 10:
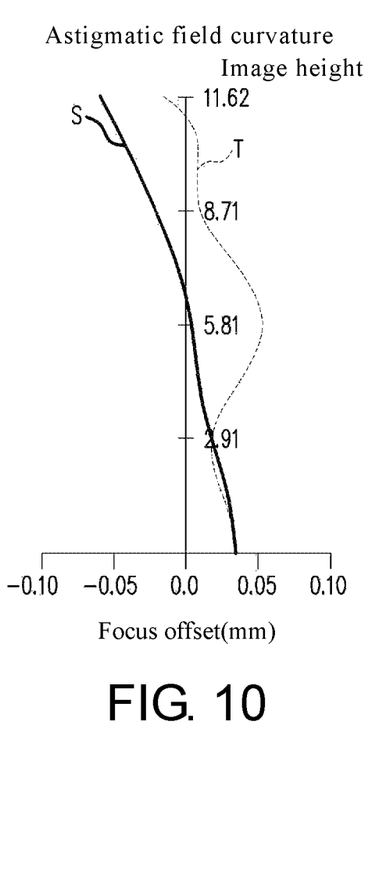
Figure 11:
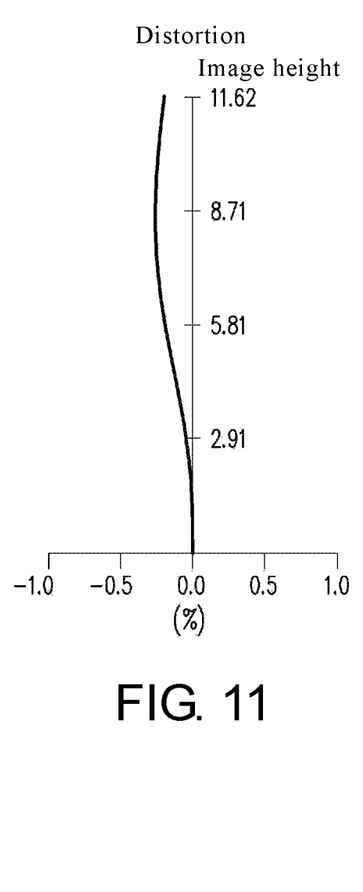

FIG. 2 to FIG. 7 are respectively a modulation transfer function (MTF) curve diagram, a longitudinal spherical aberration diagram, an astigmatic field curvature diagram, a distortion diagram, a ray fan plot diagram and a lateral color aberration diagram of a zoom projection lens at the wide-end according to an embodiment of the invention. FIG. 8 to FIG. 13 are respectively a modulation transfer function curve diagram, a longitudinal spherical aberration diagram, an astigmatic field curvature diagram, a distortion diagram, a ray fan plot diagram and a lateral color aberration diagram of a zoom projection lens at the tele-end according to an embodiment of the invention. The diagrams shown in FIG. 2 to FIG. 13 are all within a standard range, thereby verifying that the zoom projection lens 100 of the embodiment may achieve good optical imaging quality. In FIG. 2 and FIG. 8, the horizontal axis (the "focus offset") represents the distance from the center of the image to the edge, where "0" on the horizontal axis represents the center of the zoom projection lens; the maximum value "1" on the vertical axis (the "Modulus of optical transfer function") means that all light passes through the lens; "F1: Diffraction limit" refers to the diffraction limit, i.e., the physical limit of the zoom projection lens according to the diffraction formula; "(RIH)" refers to the real image height; "T" on the left of (RIH) refers to the light in tangential direction; "R" on the left of (RIH) refers to the light in sagittal direction; "F1: (RIH) 0.000 mm" refers to the MTF (Modulus of optical transfer function) of light of the image source when the object height is 0.000 mm (i.e., the MTF of light of the image source at the object optical axis); "F2: T(RIH) 2.905 mm" and "F2: R(RIH) 2.905 mm" respectively refer to the MTF of the light in tangential and sagittal directions of the image source when the object height is 2.905 mm (i.e., 0.25 times the real image height); "F3: T(RIH) 5.810 mm" and "F3: R(RIH) 5.810 mm" respectively refer to the MTF of the light in tangential and sagittal directions of the image source when the object height is 5.810 mm (i.e., 0.5 times the real image height); "F4: T(RIH) 8.714 mm" and "F4: R(RIH) 8.714 mm" respectively refer to the MTF of the light in tangential and sagittal directions of the image source when the object height is 8.714 mm (i.e., 0.75 times the real image height); and "F5: T(RIH) 11.618 mm" and "F4: R(RIH) 11.618 mm" respectively refer to the MTF of the light in tangential and sagittal directions of the image source when the object height is 11.618 mm (i.e., 1 time the real image height; the real image height).

Figure 6A:
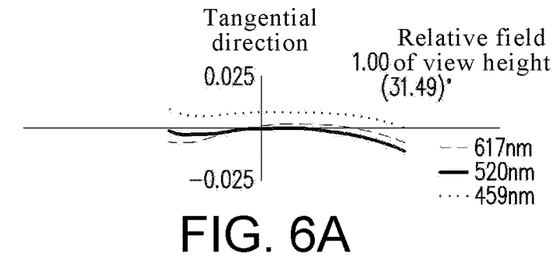
Figure 6B:
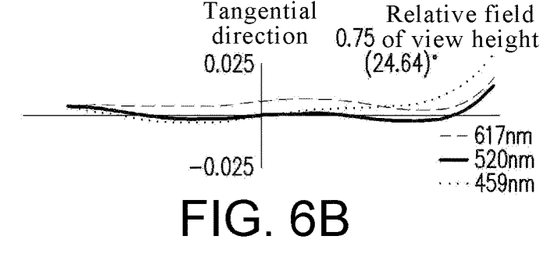
Figure 6C:
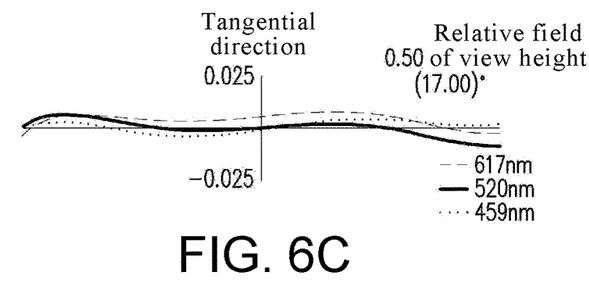
Figure 6D:
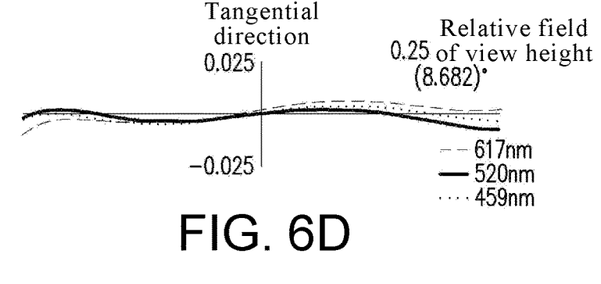
Figure 6E:
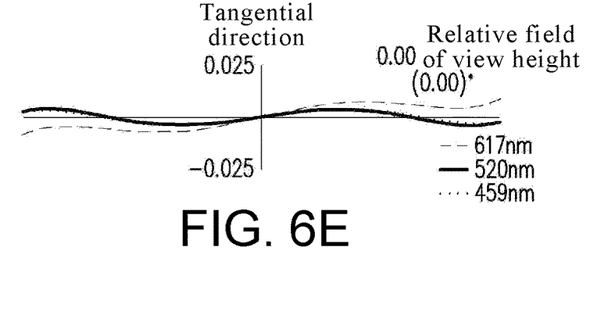
Figure 6F:
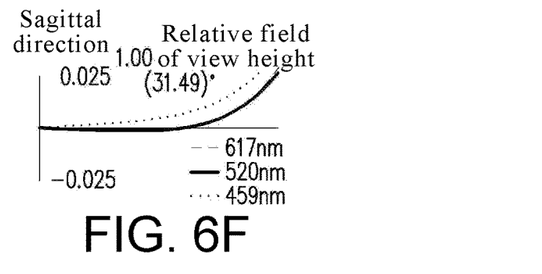
Figure 6G:
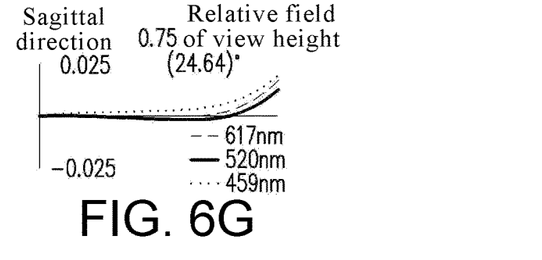
Figure 6H:
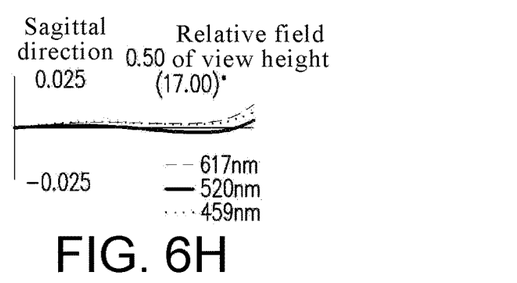
Figure 6I:
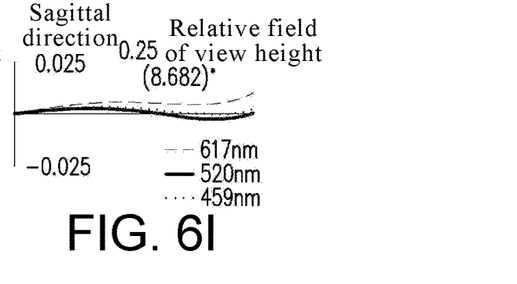
Figure 6J:
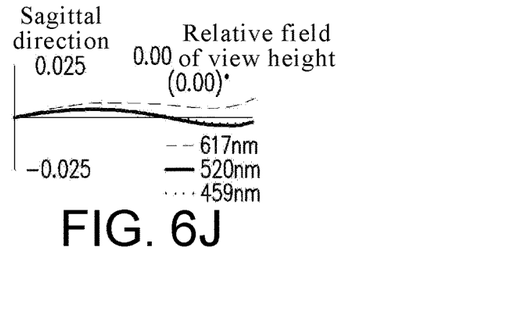
Figure 7:
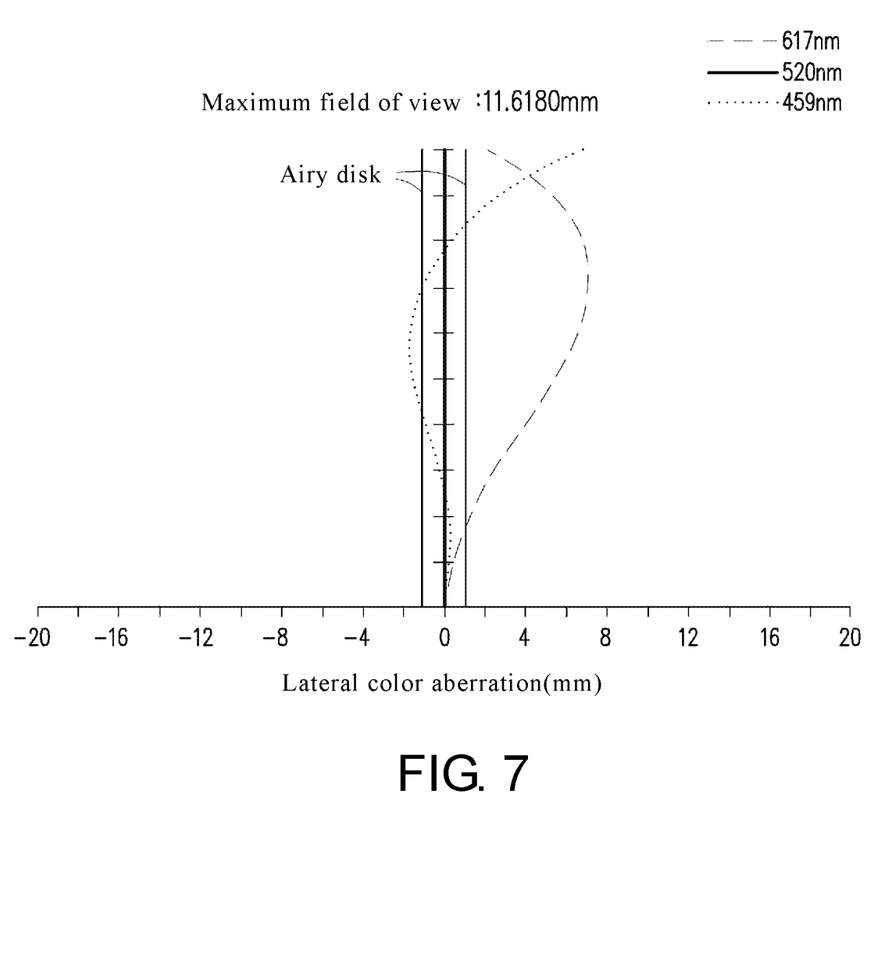

In FIG. 6A and FIG. 6F, "Relative field 1.00 of view height (31.49)°" means that the half field of view (0.5*FOV) corresponding to the image source at the object height (1 time the real image height) is 31.49 degrees; "Relative field 0.75 of view height (24.64)°"in FIG. 6B and FIG. 6G means that the half field of view corresponding to the image source at the object height (0.75 times the real image height) is 24.64 degrees; "Relative field 0.50 of view height (17.00)°" in FIG. 6C and FIG. 6H means that the half field of view corresponding to the image source at the object height (0.50 times the real image height) is 17.00 degrees; "Relative field 0.25 of view height (8.682)°" in FIG. 6D and FIG. 6I means that the half field of view corresponding to the image source at the object height (0.25 times the real image height) is 8.682 degrees; and "Relative field 0.00 of view height (0.00)°" in FIG. 6E and FIG. 6J means that the half field of view corresponding to the image source at the object optical axis (0 times the real image height) is 0.00 degrees.

Figure 12A:
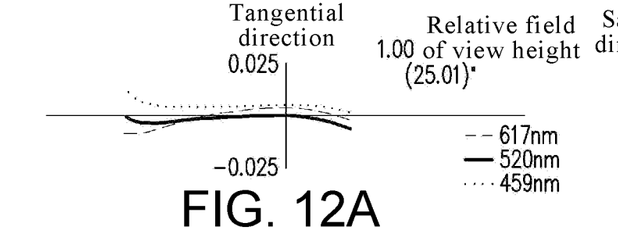
Figure 12B:
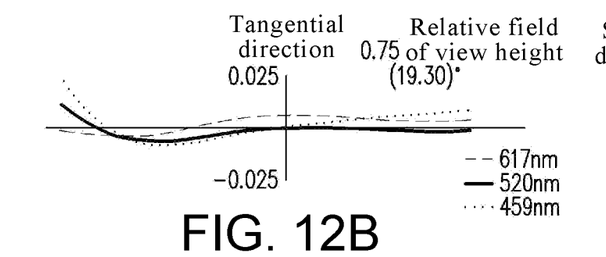
Figure 12C:
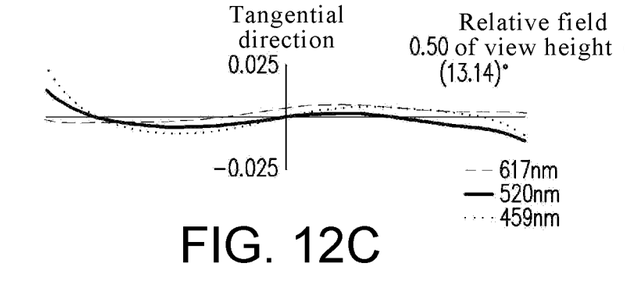
Figure 12D:
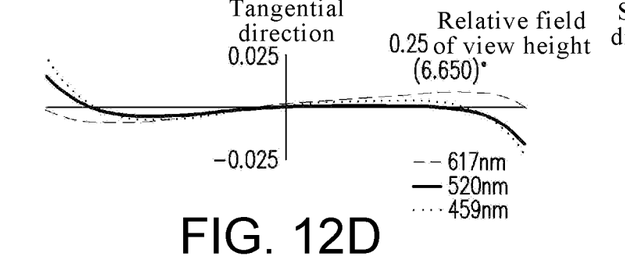
Figure 12E:
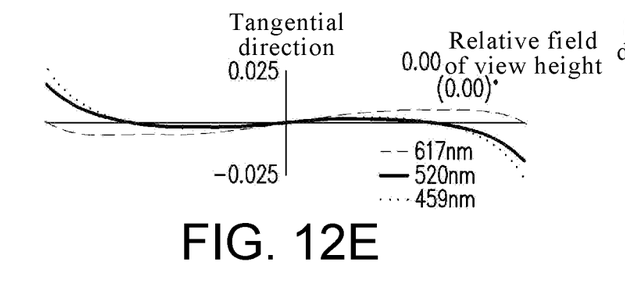
Figure 12F:
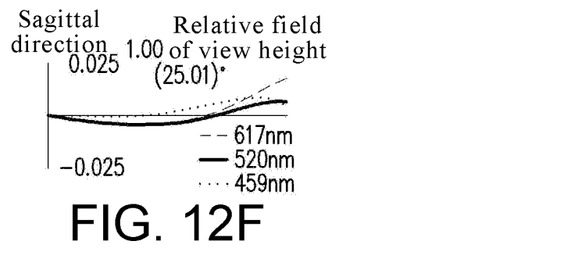
Figure 12G:
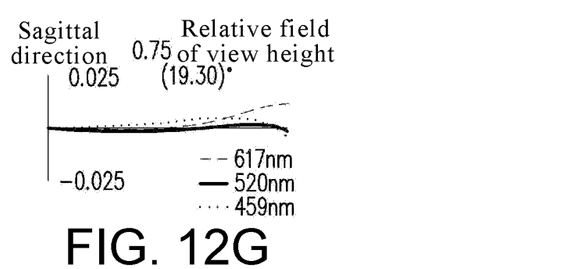
Figure 12H:
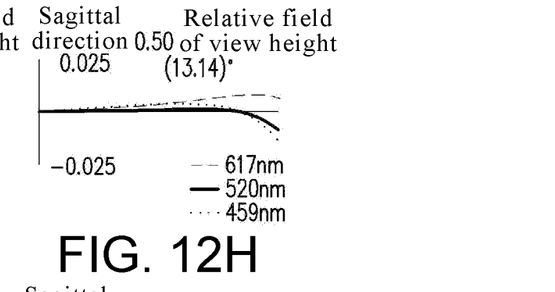
Figure 12I:
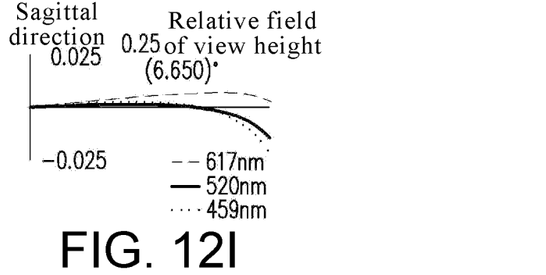
Figure 12J:
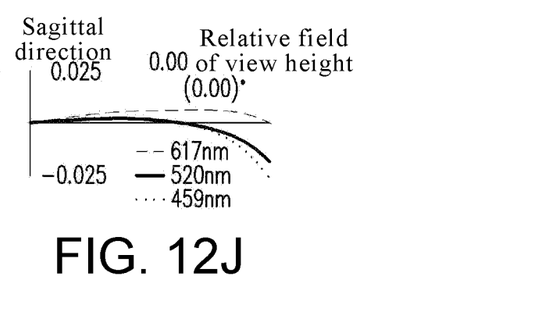
Figure 13:
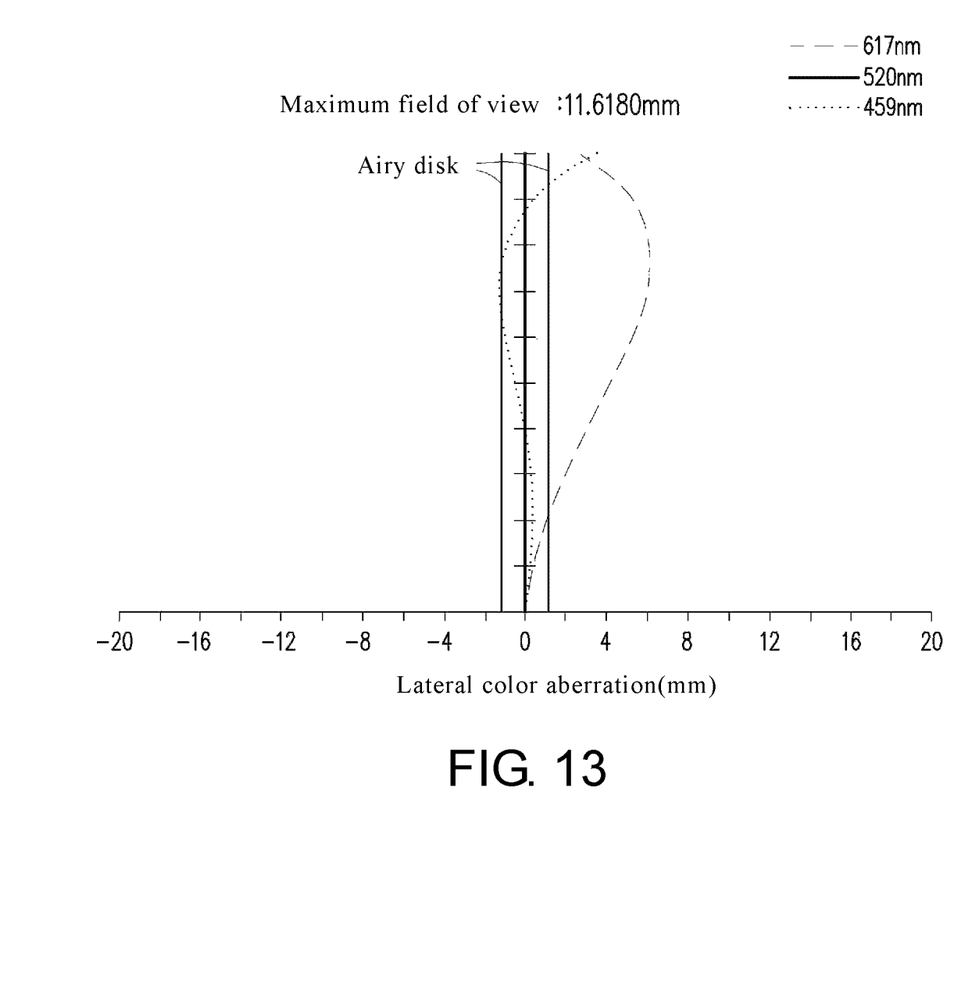

Similarly, "Relative field 1.00 of view height (25.01)°" in FIG. 12A and FIG. 12F means that the half field of view corresponding to the image source at the object height (1 times the real image height) is 25.01 degrees; "Relative field 0.75 of view height (19.30)°" in FIG. 12B and FIG. 12G means that the half field of view corresponding to the image source at the object height (0.75 times the real image height) is 19.30 degrees; "Relative field 0.50 of view height (13.14)°" in FIG. 12C and FIG. 12H means that the half field of view corresponding to the image source at the object height (0.50 times the real image height) is 13.14 degrees; "Relative field 0.25 of view height (6.650)°" in FIG. 12D and FIG. 12I means that the half field of view corresponding to the image source at the object height (0.25 times the real image height) is 6.650 degrees; "Relative field 0.00 of view height (0.00)°" in FIG. 12E and FIG. 12J means that the half field of view corresponding to the image source at the object optical axis (0 times the real image height) is 0.00 degrees.

In summary, the embodiment of the invention has at least one of following advantages or effects. Compared with the existing zoom projection lens, the zoom projection lens of the invention uses eleven lens elements to form five lens groups, and by adjusting relative positions of the five lens groups, a zoom function is realized. Moreover, the first lens element is an aspheric lens made of plastic, which avails reducing the manufacturing cost and maintaining optical imaging quality. Therefore, the zoom projection lens of the invention is capable of maintaining good optical imaging quality while reducing the number of lens elements.

Furthermore, by configuring the aperture stop between the third lens group and the fourth lens group (i.e. to configure the aperture stop near the center of the zoom projection lens), which avails a design of an exit pupil, and avails achieving a required zoom ability. The negative refractive power of the first lens group avails improving a light collecting effect and facilitates an optical path design and lens fabrication. The refractive powers of the second lens group to the fifth lens group being positive, positive, negative and positive avails aberration correction. The positive refractive power of the fifth lens group results in a better light converging effect, and avails improving resolution of a projection image. By making the second lens element to the eleventh lens element to be all spherical lens elements, it avails reducing a whole manufacturing cost of the zoom projection lens. By making the sixth lens element and the seventh lens element to form a double cemented lens, and making the eighth lens element and the ninth lens element to form another one double cemented lens, it not only helps aberration correction, but also helps reducing a total length of the fourth lens group, so as to further reduce a volume of the zoom projection lens. The zoom projection lens may be a true zoom lens, so that the clarity of the projection image may be adjusted without performing additional focusing steps. In an embodiment, the volume of the zoom projection lens and the optical imaging quality may be balanced by adjusting the ratio between the effective focal length of the lens group(s) and the effective focal length of the zoom projection lens.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A zoom projection lens, wherein the zoom projection lens has eleven lens elements, and the zoom projection lens sequentially comprises a first lens group, a second lens group, a third lens group, an aperture stop, a fourth lens group and a fifth lens group along an optical axis from a screen side to an image source side, wherein
   the first lens group has a negative refractive power and comprises three lens elements;
   the second lens group has a positive refractive power and comprises one lens;
   the third lens group has a positive refractive power and comprises one lens;
   the fourth lens group has a negative refractive power and comprises four lens elements; and
   the fifth lens group has a positive refractive power and comprises two lens elements,
   wherein a first lens element in the first lens group is an aspheric lens made of plastic.

2. The zoom projection lens as claimed in claim 1, wherein the first lens group comprises the first lens element, a second lens element and a third lens element, the second lens group comprises a fourth lens element, the third lens group comprises a fifth lens element, the fourth lens group comprises a sixth lens element, a seventh lens element, an eighth lens element and a ninth lens element, and the fifth lens group comprises a tenth lens element and an eleventh lens element, the first lens element to the eleventh lens element are sequentially arranged along the optical axis from the screen side to the image source side, and refractive powers of the first lens element to the eleventh lens element are sequentially negative, negative, positive, positive, positive, negative, positive, negative, positive, positive and positive.

3. The zoom projection lens as claimed in claim 2, wherein the sixth lens element and the seventh lens element construct a double cemented lens, and the eighth lens element and the ninth lens element construct a double cemented lens.

4. The zoom projection lens as claimed in claim 2, wherein the second lens element and the eleventh lens element are all spherical lens elements.

5. The zoom projection lens as claimed in claim 4, wherein the second lens element to the eleventh lens element are all lens elements made of glass.

6. The zoom projection lens as claimed in claim 2, wherein the first lens element is a convex-concave lens and a convex surface thereof faces the screen side, the second lens element is a biconcave lens, the third lens element is a plano-convex lens and a convex surface thereof faces the image source side, the fourth lens element is a plano-convex lens and a convex surface thereof faces the image source side, the fifth lens element is a convex-concave lens and a convex surface thereof faces the screen side, the sixth lens element is a biconcave lens, the seventh lens element is a biconvex lens, the eighth lens element is a biconcave lens, the ninth lens element is a biconvex lens, the tenth lens element is a biconvex lens, and the eleventh lens element is a plano-convex lens and a convex surface thereof faces the screen side.

7. The zoom projection lens as claimed in claim 1, wherein the zoom projection lens satisfies:

1.6<|F1/Fw|<2.1;
4.8<|F2/Fw|<5.8;
5.0<|F4/Fw|<15.0; and
1.8<|F5/Fw|<2.5, wherein Fw is an effective focal length of the zoom projection lens, F1 is an effective focal length of the first lens group, F2 is an effective focal length of the second lens group, F4 is an effective focal length of the fourth lens group, and F5 is an effective focal length of the fifth lens group.

8. The zoom projection lens as claimed in claim 1, wherein a zoom ratio of the zoom projection lens is 1.3, and an F number of the zoom projection lens at a wide-end is smaller than 1.7.

9. The zoom projection lens as claimed in claim 1, wherein the first lens group is adapted to move along the optical axis between the screen side and the image source side, so as to focus the zoom projection lens.

10. The zoom projection lens as claimed in claim 1, wherein the second lens group, the third lens group and the fourth lens group are adapted to move along the optical axis between the screen side and the image source side, so as to adjust a size of a projection image.

11. The zoom projection lens as claimed in claim 10, wherein the fifth lens group is stationary when adjusting the size of the projection image.

* * * * *